Nov. 10, 1931.    L. R. LUDWIG    1,831,420
HIGH FREQUENCY SUPPLY PROTECTIVE SYSTEM
Filed July 5, 1929
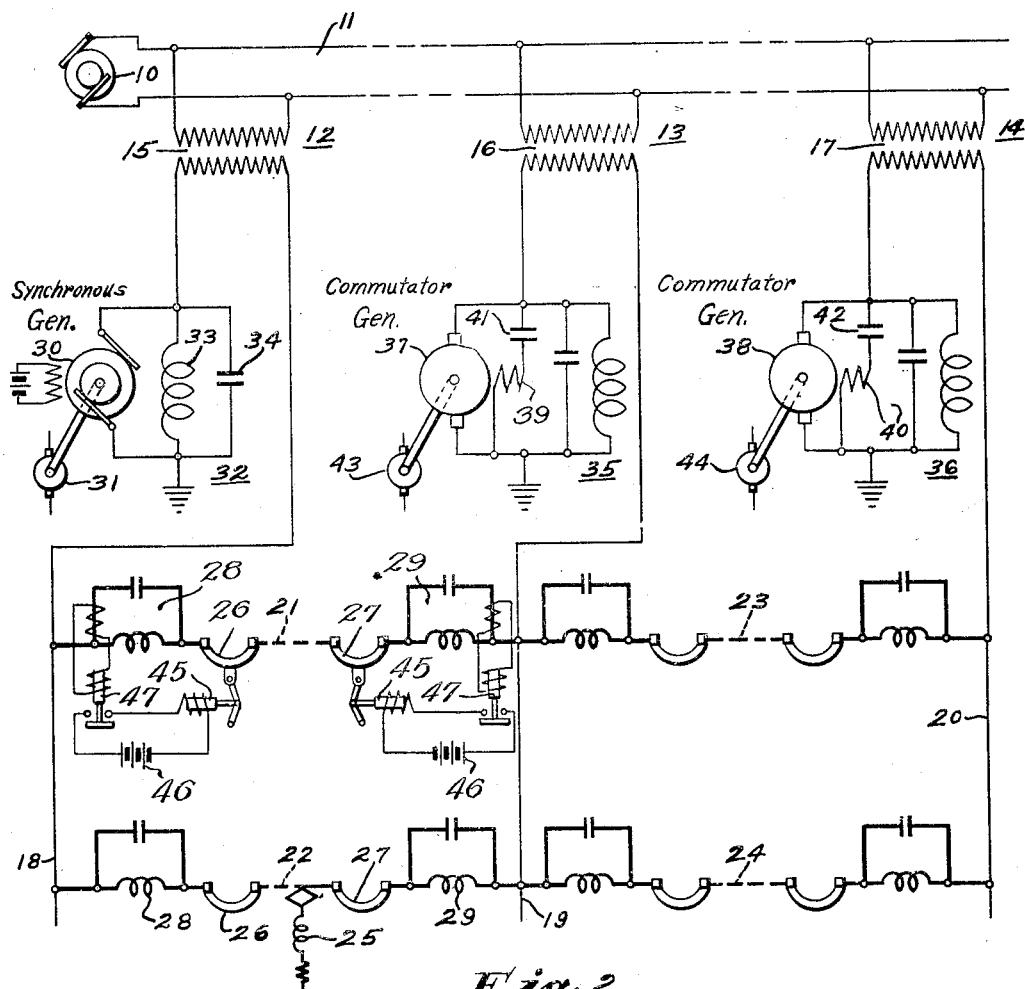
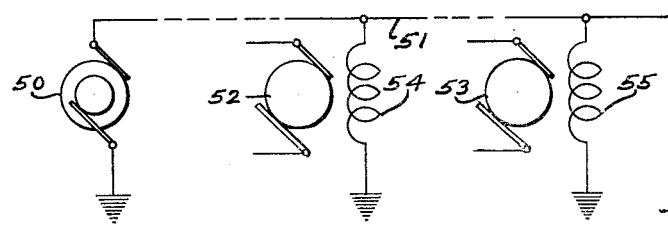
INVENTOR
Leon R. Ludwig
BY
ATTORNEY Patented Nov. 10, 1931

1,831,420

UNITED STATES PATENT OFFICE

LEON R. LUDWIG, OF WILKINSBURG, PENNSYLVANIA, ASSIGNOR TO WESTINGHOUSE ELECTRIC & MANUFACTURING COMPANY, A CORPORATION OF PENNSYLVANIA

HIGH-FREQUENCY SUPPLY PROTECTIVE SYSTEM

Application filed July 5, 1929. Serial No. 376,153.

My invention pertains generally to protective systems for electrical distribution circuits and, in particular, to protective systems utilizing a high-frequency alternating current superposed upon the main power current which traverses the distribution circuit.

It is the principal object of my invention to provide a suitable source of high-frequency control current for operating the controlling devices in a protective system of the type mentioned.

A further object of my invention is to eliminate the necessity, encountered heretofore in systems of this type, for synchronizing a plurality of sources of auxiliary, high-frequency control current.

A further object of my invention is to utilize a commutator alternating-current generator as an amplifier of alternating currents of small magnitude.

Further objects and advantages of my invention will become apparent in the course of the following description.

Numerous modifications of protective systems utilizing superposed high-frequency alternating currents have been previously proposed. As examples, I refer to my copending applications, Serial No. 238,861, filed December 9, 1927 and Serial No. 242,502, filed December 24, 1927. In the systems described in the applications referred to, it is found necessary to make use of a plurality of alternating-current generators for supplying high-frequency control current to a distribution circuit at various points throughout the length thereof. It is essential that these generators operate in synchronism and it is sometimes difficult to maintain this condition. It is the purpose of my invention, therefore, to take advantage of characteristics of a well known type of generator to obviate the necessity of providing separate generators which must be synchronously operated.

For a further understanding of my invention, reference is made to the accompanying drawings Fig. 1 of which illustrates diagrammatically the apparatus which I propose to employ to effect the advantages and objects heretofore outlined, and Fig. 2 illustrates diagrammatically the broad aspects of the invention.

My invention, though not limited thereto, is especially applicable to single-phase railway distribution circuits in which electrical energy is supplied from a main generator, such as that indicated at 10 in the drawings, through a high-voltage transmission line 11, to a plurality of transformer stations 12, 13 and 14. The transformer 15, 16 and 17 supply low-voltage energy to the sub-station buses 18, 19 and 20. The sections of the trolley conductors, indicated at 21, 22, 23 and 24, are connected to the sub-station buses, as shown, and thus transmit energy to the load on the system which consists of motive equipment indicated schematically at 25. Sectionalizing circuit breakers 26 and 27 are provided at the end of each section of the trolley conductors for the purpose of isolating the section upon the occurrence of a faulty condition thereon.

In my copending applications, above referred to, I have disclosed systems for causing the operation of the sectionalizing circuit breakers upon the occurrence of certain conditions to be protected against.

Parallel-resonant impedance devices 28 and 29 are connected in each line-section at the respective ends thereof, for the purposes set forth in my copending applications; namely, to effect such distribution of current in the parallel-section conductors 21 and 22 that the desired operation of the sectionalizing circuit breakers will result.

In accordance with my invention, I provide an auxiliary synchronous high-frequency generator 30 for supplying control current to the distribution system. This generator may be driven by a motor 31 or by any other suitable driving means. The motor 31 may preferably be energized from the distribution system 11 in an obvious manner. The high-frequency generator 30 is connected across a so-called blocking shunt 32 comprising an inductance 33 and a capacitance 34. These elements are so designed that the combination thereof offers a very high impedance to current of the frequency generated by the generator 30 and, at the same time, only a very slight impedance to power currents of normal frequency. This method of introducing the high-frequency currents is disclosed in my copending application Serial No. 227,462, filed October 20, 1927.

Blocking shunts 35 and 36, similar to that shown at 32, are respectively connected between corresponding terminals of the secondary windings of the transformers 16 and 17 and ground, and additional auxiliary generators 37 and 38 are located at the stations 13 and 14. The generators 37 and 38 are not of the synchronous type but are commutator machines having field-magnet windings illustrated at 39 and 40. The field-magnet windings 39 and 40 are so connected that they will be energized by the high-frequency current supplied to the system 11 by the generator 30. Blocking condensers 41 and 43 are provided in the circuits of the field windings 39 and 40, substantially to prevent the passage of current of commercial frequency through the field-magnet windings 39 and 40. The driving motors for the generators 37 and 38 are indicated at 43 and 44 but any desired driving means may be employed instead of that illustrated.

It is well known that the voltage generated by commutator alternating-current machines is similar, in all its characteristics, to that of the current energizing the field-magnet winding. I utilize this principle to produce, at the sub-stations 13 and 14, auxiliary control currents having the same frequency, wave form and phase relation to the normal-frequency current as the current supplied to the system 11 by the generator 30. The result effected by this arrangement is that the generator 30 supplies high-frequency control current to the section conductors 21 and 22 through transformer 15 and the sub-station bus 18, and also to the transmission line 11 through the transformer 15. A small high-frequency current from the generator 30 flows through the field-magnet windings 39 and 40 of the generators 37 and 38, and a current similar, in all respects, to that flowing through the field winding is supplied by the generators 37 and 38 to the sub-station buses 19 and 20 and thence to the section conductors 21 to 24.

It will be apparent that the entire distribution system consisting of the sections 21 to 24 and other similar sections will thus be supplied with a superposed high-frequency current, which, though originating at different sources, such as the generators 30, 37 and 38, is of the same frequency, phase and wave form. Thus, the necessity for synchronously driven, auxiliary high-frequency generators is eliminated and, although a plurality of generators are employed, the problem of maintaining them in synchronism no longer exists, since the phase and frequency of the output of the commutator machines is determined by similar characteristics of the output of the synchronous generator 30.

The high-frequency voltages which are superimposed on the several line-sections 21 to 24 at the various substations are utilized to selectively and simultaneously trip the two circuit breakers 26 and 27 at the ends of any section in which a fault may occur, as set forth in any of my previously mentioned earlier applications. Thus, as shown in my application Serial No. 227,462, each of the circuit breakers 26, 27 may be provided with a tripping coil 45 which is energized from a battery 46 through a relay 47 actuated in accordance with the high-frequency current in the capacitor branch of the blocking device 28 or 29, as the case may be. When a fault occurs in any line-section 21, 22, 23 or 24, high-frequency current is fed into the line from both ends from two of the auxiliary generators 30, 37 and 38, and the high-frequency current in the blocking impedances 28 and 29 in the faulted line-section attains a sufficiently high value to trip the two circuit breakers in that line-section. The significant thing about my present invention is the utilization of commutator machines for all but one of the sources of high-frequency relaying energy, thereby avoiding the difficulties heretofore experienced in synchronizing, and maintaining synchronism of, the various high-frequency generators distributed along the line in the various substations.

Fig. 2 is a schematic illustration of my invention in its broader aspects. The embodiment of the invention shown in Fig. 2 comprises a synchronous generator 50 adapted to supply high-frequency control energy to a pilot wire 51. At spaced points along the length of the pilot-wire, commutator generators 52 and 53 are provided having any suitable driving means. The commutator generators have field-magnet windings 54 and 55 connected to the pilot wire 51. The result of this arrangement of the apparatus is that the synchronous generator 50 supplies to the field-magnet windings 54 and 55 of the commutator generators 52 and 53. The armature windings of the latter may be connected to any circuit to which it is desired to supply control current having the frequency of the generator 50.

In accordance with the explanation of my invention in the foregoing paragraphs, the output of the commutator generators 52 and 53 will be similar in all respects to the excitation supplied to the field windings thereof, the commutator machines serving merely to amplify the pilot-wire current without changing its electrical characteristics. By these means, it is possible to distribute a high-frequency control current over a large territory without the necessity of maintaining synchronous generators in parallel, since the small current traversing the pilot wire may be amplified by commutator generators to any degree desired.

Although I have described and illustrated but two embodiments of the systems utilizing features of my invention, it is to be understood that changes and alterations therein will doubtless occur to those skilled in the art. It is not my intention, therefore, to be limited by the details of the disclosure, except as indicated by the appended claims.

I claim as my invention:

1. A high-frequency relaying system of the type having two auxiliary sources of relaying current of the same high frequency feeding into the ends of a line-section of an electric power line, and means for simultaneously interrupting both ends of a line-section in response to a high-frequency circuit-condition in the event of a fault in that line-section, characterized by the fact that the auxiliary high-frequency sources connected to said power line comprise a commutator generator and a synchronous generator at different ends of a line-section.

2. A high-frequency relaying system of the type having two auxiliary sources of relaying current of the same high frequency feeding into the ends of a line-section of an electric power line, and means for simultaneously interrupting both ends of a line-section in response to a high-frequency circuit-condition in the event of a fault in that line-section, characterized by the fact that the auxiliary high-frequency sources connected to said line comprise a non-synchronous dynamo-electric generator and a source capable of supplying exciting components and/or controlling the frequency, at different ends of a line-section.

3. A high-frequency relaying system of the type having two auxiliary sources of relaying current of the same high frequency feeding into the ends of a line-section of an electric power line, and means for simultaneously interrupting both ends of a line-section in response to a high-frequency circuit-condition in the event of a fault in that line-section, characterized by the fact that the auxiliary high-frequency sources connected to said power line comprise a synchronous generator and a non-synchronous source at different ends of a line-section.

4. An alternating-current power-line section having a circuit breaker at each end, two auxiliary sources of relaying current of the same frequency feeding into the ends of said line-section, said relaying frequency being different from said power-line frequency, and means for simultaneously interrupting both ends of said line-section in response to a relaying-frequency circuit-condition in the event of a fault in that line-section, characterized by the fact that the auxiliary relaying-frequency sources connected to said power line comprise a commutator generator and a synchronous generator at different ends of a line-section.

5. An alternating-current power-line section having a circuit breaker at each end, two auxiliary sources of relaying current of the same frequency feeding into the ends of said line-section, said relaying frequency being different from said power-line frequency, and means for simultaneously interrupting both ends of said line-section in response to a relaying-frequency circuit-condition in the event of a fault in that line-section, characterized by the fact that the auxiliary relaying-frequency sources connected to said power line comprise a non-synchronous dynamo-electric generator and a source capable of supplying exciting components and/or controlling the frequency, at different ends of a line-section.

6. An alternating-current power-line section having a circuit breaker at each end, two auxiliary sources of relaying current of the same frequency feeding into the ends of said line-section, said relaying frequency being different from said power-line frequency, and means for simultaneously interrupting both ends of said line-section in response to a relaying-frequency circuit-condition in the event of a fault in that line-section, characterized by the fact that the auxiliary relaying-frequency sources connected to said power line comprise a synchronous generator and a non-synchronous dynamo-electric machine at different ends of a line-section.

In testimony whereof, I have hereunto subscribed my name this 26th day of June, 1929.

LEON R. LUDWIG.